United States Patent
Kikunaga et al.

(10) Patent No.: US 11,144,016 B2
(45) Date of Patent: Oct. 12, 2021

(54) OUTPUT CONTROL UNIT, OUTPUT CONTROL SYSTEM, AND CONTROL METHOD OF OUTPUT CONTROL UNIT

(71) Applicant: OMRON Corporation, Kyoto (JP)

(72) Inventors: Yoshitaka Kikunaga, Kusatsu (JP); Kenji Sato, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/086,564

(22) PCT Filed: Apr. 28, 2017

(86) PCT No.: PCT/JP2017/016921
§ 371 (c)(1),
(2) Date: Sep. 19, 2018

(87) PCT Pub. No.: WO2017/188432
PCT Pub. Date: Nov. 2, 2017

(65) Prior Publication Data
US 2019/0101873 A1    Apr. 4, 2019

(30) Foreign Application Priority Data

Apr. 28, 2016  (JP) .............................. JP2016-091824
Apr. 27, 2017  (JP) ................................. 2017-088770

(51) Int. Cl.
*G05B 11/42*    (2006.01)
*G05B 19/05*    (2006.01)
(Continued)

(52) U.S. Cl.
CPC ............ *G05B 11/42* (2013.01); *G05B 13/021* (2013.01); *G05B 13/024* (2013.01); *G05B 19/05* (2013.01);
(Continued)

(58) Field of Classification Search
CPC .... G05B 11/42; G05B 13/021; G05B 19/054; G05B 2219/1162; G05B 19/042;
(Continued)

(56) References Cited

U.S. PATENT DOCUMENTS 4,477,733 A    10/1984  Herdeman
4,660,057 A    4/1987   Watanabe et al.
(Continued)

FOREIGN PATENT DOCUMENTS

CN    1431567 A    7/2003
CN    1645158 A    7/2005
(Continued)

OTHER PUBLICATIONS

English translation of the International Search Report of PCT/JP2017/016921 dated Aug. 1, 2017.
(Continued)

*Primary Examiner* — Michael D Masinick
(74) *Attorney, Agent, or Firm* — Metrolex IP Law, PLLC

(57) ABSTRACT

A temperature control unit has an acquisition unit that acquires first information regarding driving and stopping of a heater and second information indicating whether or not to subject a time proportional output to an SSR to autonomous control and an SSR control unit that performs time proportional output of an instruction to drive or stop the heater, to the SSR.

14 Claims, 7 Drawing Sheets

(51) Int. Cl.
  *G05B 13/02* (2006.01)
  *G05D 23/19* (2006.01)
  *G05D 23/30* (2006.01)
  *G05B 19/042* (2006.01)

(52) U.S. Cl.
  CPC ....... *G05B 19/054* (2013.01); *G05D 23/1919* (2013.01); *G05D 23/30* (2013.01); *G05B 19/042* (2013.01); *G05B 2219/1162* (2013.01); *G05B 2219/2614* (2013.01)

(58) Field of Classification Search
  CPC .......... G05B 2219/2614; G05B 13/024; G05B 19/05; G05D 23/30; G05D 23/1919
  See application file for complete search history.

(56) References Cited

U.S. PATENT DOCUMENTS

| | | | |
|---|---|---|---|
| 2003/0130750 A1* | 7/2003 | Hirayama | G05B 11/42 700/53 |
| 2004/0148059 A1 | 7/2004 | Tanaka | |
| 2006/0207272 A1* | 9/2006 | Hirayama | G05D 23/1919 62/157 |
| 2007/0185593 A1 | 8/2007 | Tanaka et al. | |
| 2012/0240132 A1 | 9/2012 | Kobayashi et al. | |
| 2013/0166075 A1 | 6/2013 | Castillo et al. | |
| 2013/0341318 A1 | 12/2013 | Nagasaka et al. | |
| 2015/0077026 A1 | 3/2015 | Ito et al. | |
| 2015/0243461 A1 | 8/2015 | Werth et al. | |
| 2019/0101875 A1 | 4/2019 | Kikunaga et al. | |

FOREIGN PATENT DOCUMENTS

| | | |
|---|---|---|
| CN | 1834826 A | 9/2006 |
| CN | 102637053 A | 8/2012 |
| CN | 102804086 A | 11/2012 |
| CN | 103034264 A | 4/2013 |
| CN | 103597907 A | 2/2014 |
| CN | 104467621 A | 3/2015 |
| CN | 104863732 A | 8/2015 |
| EP | 2487989 A1 | 8/2012 |
| JP | H6-202743 A | 7/1994 |
| JP | 2001-22404 A | 1/2001 |
| JP | 3468350 B2 | 11/2003 |
| JP | 2006-115634 A | 4/2006 |
| JP | 2006-260047 A | 9/2006 |
| JP | 2007-207129 A | 8/2007 |
| JP | 2007205514 A | 8/2007 |
| JP | 2007-280142 A | 10/2007 |
| JP | 2013-45347 A | 3/2013 |

OTHER PUBLICATIONS

English translation of the Written Opinion of PCT/JP2017/016921 dated Aug. 1, 2017.
U.S. Office Action dated Dec. 12, 2019 in a related U.S. Appl. No. 16/086,888.
English translation of the International Search Report (ISR) of PCT/JP2017/016922 dated Jun. 6, 2017 which was submitted in the IDS dated Sep. 20, 2018 in a related U.S. Appl. No. 16/086,888.
English translation of the Written Opinion of PCT/JP2017/016922 dated Jun. 6, 2017 which was submitted in the IDS dated Sep. 20, 2018 in a related U.S. Appl. No. 16/086,888.
Extended European search report ("EESR") dated Jun. 25, 2019 which was submitted in the IDS dated Aug. 28, 2019 in a related U.S. Appl. No. 16/086,888.
Office Action dated Oct. 30, 2020 in a counterpart Chinese patent application.
Office Action (CNOA) dated Oct. 10, 2020 in a counterpart Chinese patent application of a Yelated U.S. Appl. No. 16/086,888.
U.S. Office Action dated Sep. 29, 2020 in a related U.S. Appl. No. 16/086,888.
U.S. Office Action dated Jun. 16, 2020 in a related U.S. Appl. No. 16/086,888.
U.S. Office Action dated May 28, 2021 for the related U.S. Appl. No. 16/086,888.

* cited by examiner

OUTPUT CONTROL UNIT, OUTPUT CONTROL SYSTEM, AND CONTROL METHOD OF OUTPUT CONTROL UNIT

TECHNICAL FIELD

The present invention relates to an output control unit that performs output control of an output apparatus according to information from a control apparatus.

RELATED ART

Conventionally, in the field of factory automation (FA), a system configuration is adopted in which a controller such as a PLC (programmable logic controller) controls various input/output units such that the input/output units exchange data with input/output apparatuses. FIG. 7 is a diagram showing an outline of a conventional output control system. FIG. 7 shows a system in which a heater is used to control the temperature of a target object, as an example. As illustrated, a controller transmits various instructions or various types of information to various units, and the various units collect data from an input/output apparatus (e.g., a temperature sensor).

RELATED ART DOCUMENTS

Patent Documents

Patent Document 1: Japanese Publication of Unexamined Patent Application "JP-A-2007-280142" (Publication date: Oct. 25, 2007)

SUMMARY OF THE INVENTION

Problem to be Solved by the Invention

Incidentally, in a system that performs temperature control as shown in FIG. 7, a heater, which is an example of an output apparatus, is connected to a digital output unit via an SSR. In addition, the digital output unit, which is an example of various units, is connected to a controller via a network. In such a system, temperature control is performed by the digital output unit turning on or off the heater via the SSR in accordance with TPO (time proportional output) from the controller. Here, "time proportional output" refers to an output method for proportionally changing the time ratios of on and off as the output.

Incidentally, in various conventional units, if the apparatus to which the units belong performs control processing related to TPO, there was a risk that a timing when various types of information (e.g., information such as a driving amount of an input/output apparatus or a driving or stopping instruction) is acquired from the controller differs from a timing when the information is reflected in the output through TPO.

For example, if a unit acquires information from the controller during a certain TPO control cycle, the information is reflected from the next TPO control cycle. This time lag is more significant if the period of one control cycle is long. For example, when performing output control of a cooling device such as a fan, one control cycle is often long, for example, 20 seconds, and thus the influence of this difference could not be ignored.

The invention has been made in light of the above-described problem, and aims to realize an output control unit and the like that can appropriately control time proportional output depending on the situation.

Means for Solving the Problems

In order to solve the above-described issue, an output control unit according to the invention is connected to a switching apparatus that switches between driving and stopping of an output apparatus, and includes an acquisition unit that acquires, from a control apparatus, first information regarding driving and stopping of the output apparatus and second information indicating whether or not to subject a time proportional output to the switching apparatus to autonomous control, and an instruction output unit that performs time proportional output of an instruction to drive or stop the output apparatus, to the switching apparatus in accordance with the first information and the second information.

In addition, in order to solve the above-described issue, a control method of an output control unit according to the invention is a control method of an output control unit connected to a switching apparatus that switches between driving and stopping of an output apparatus, and includes an acquisition step of acquiring, from a control apparatus, first information regarding driving and stopping of the output apparatus and second information indicating whether or not to subject a time proportional output to the switching apparatus to autonomous control, and an instruction output step of performing time proportional output of an instruction to drive or stop the output apparatus, to the switching apparatus in accordance with the first information and the second information.

Effects of the Invention

According to the present invention, time proportional output that is performed by an output control unit can be appropriately controlled depending on the situation.

EMBODIMENTS OF THE INVENTION

First Embodiment

A first embodiment of the invention will be described below with reference to FIGS. 1 to 4. To begin with, an output control system 100 according to this embodiment will be described with reference to FIGS. 1 and 2.

Apparatuses Included in System and Their Connection

Figure 2:
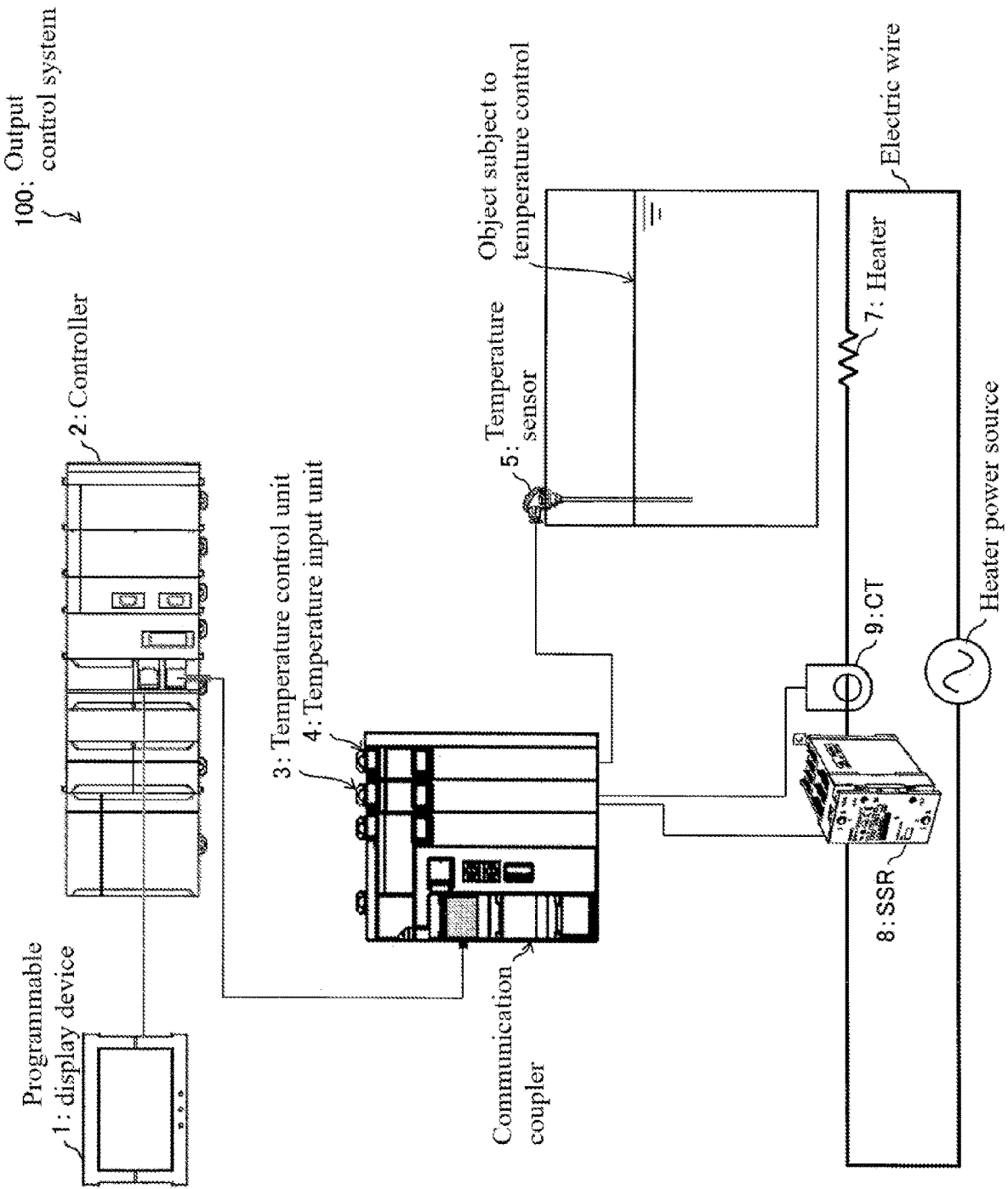
FIG. 2 is a diagram showing an outline of the above-described output control system.

The output control system 100 is a system for adjusting the temperature of a certain target object (e.g., a resin or water), and is a system for detecting whether or not a heater, a cooling apparatus, or the like that is used for temperature adjustment is properly driven or stopped. To begin with, apparatuses (units) included in the output control system 100 and their connection will be described with reference to FIG. 2. FIG. 2 is a diagram showing an outline of the output control system 100. The output control system 100 includes at least a controller (control apparatus) 2, a temperature control unit (output control unit) 3, a heater (output apparatus) 7, an SSR (solid state relay, switching apparatus) 8, and a CT (current transformer, measurement apparatus) 9. The output control system 100 may also include a programmable display device 1, a temperature input unit 4, and a temperature sensor 5, which are not necessary constituent elements.

As illustrated, the controller 2 is connected to the programmable display device 1, the temperature control unit 3, and the temperature input unit 4 via a communication coupler using a field network. Also, the temperature control unit 3 is connected to the controller 2, the SSR 8, and the CT 9. In addition, the temperature input unit 4 is connected to the controller 2 and the temperature sensor 5. Furthermore, the SSR 8, the CT 9, and the heater 7 are connected to each other along with a heater power supply using an electric wire.

Main Configuration of Each Apparatus

Figure 1:
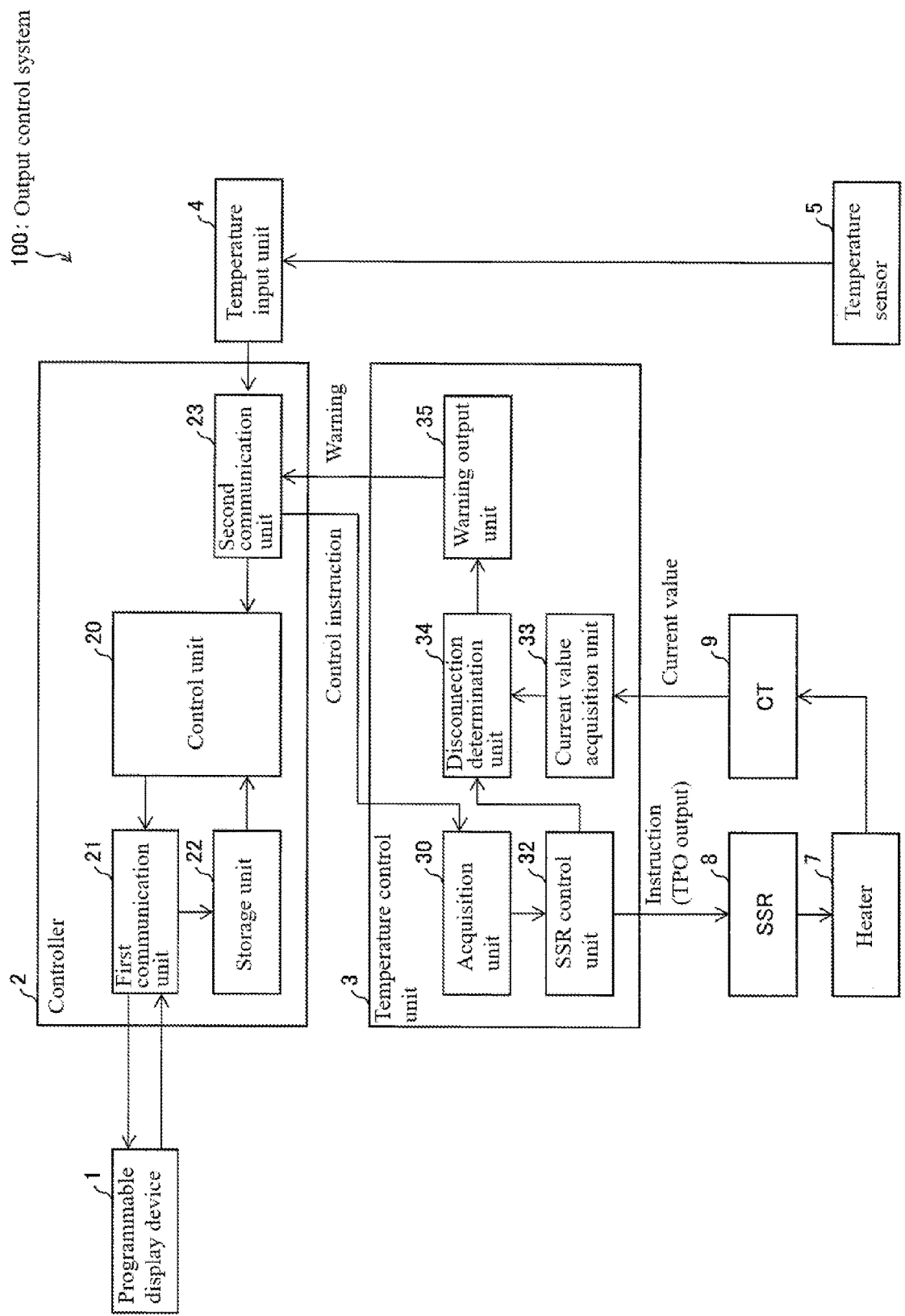
FIG. 1 is a block diagram showing the main configuration of apparatuses and units included in an output control system according to a first embodiment of the invention.

Next, actions of the apparatuses (units) will be described with reference to FIG. 1. FIG. 1 is a block diagram showing a main configuration of the apparatuses and units included in the output control system 100.

Programmable Display Device 1

The programmable display device 1 is an HMI (human machine interface) that outputs, from the terminal thereof, data and notifications received from the controller 2 (displays data and notifications on a display unit, or outputs sound such as an alarm), and thereby presents the data and notifications to the user. Note that a configuration may also be adopted in which the programmable display device 1 has an input unit, and the input unit transmits an instruction received from the user to the controller 2.

Controller 2

The controller 2 is a PLC (programmable logic controller) that receives data blocks circulating around a communication network that is a field network (hereinafter, simply referred to as "communication network"), adds various types of data in the data blocks, and returns the data blocks including the various types of data to the above-noted communication network. Here, "data block" refers to a collection of data that circulates (is exchanged periodically) between various devices connected to the communication network. The cycle of circulation of the data blocks is determined according to the cycle time of the controller 2.

The temperature control unit 3 connected to the communication network receives the data blocks, and reads various types of data, which will be described later in detail. In addition, the controller 2 reads various types of data included in the data blocks by the temperature control unit 3 and the temperature input unit 4. More specifically, the controller 2 includes a first communication unit 21, a storage unit 22, a second communication unit 23, and a control unit 20.

The first communication unit 21 performs communication between the controller 2 and the programmable display device 1. Upon receiving various types of data and warnings from the control unit 20, the first communication unit 21 transmits the data and warnings to the programmable display device 1. In addition, upon receiving a user instruction from the programmable display device 1, the first communication unit 21 transmits the user instruction to the control unit 20.

The storage unit 22 stores user programs. Here, "user program" is a program that specifies various operations and settings of the controller 2. A user program is generated by a setting tool (application) and the like installed in a general-purpose computer or the like, is downloaded to the controller 2 connected to the general-purpose computer, and is stored in the storage unit 22. For example, a user program may include a program that specifies the times when the heater 7 should be driven or stopped. A user program is read out and executed by the control unit 20.

The second communication unit 23 performs communication between the controller 2, the temperature control unit 3, and the temperature input unit 4. The second communication unit 23 adds, in a data block, information indicating a control instruction generated by the control unit 20, or information indicating the values of various parameters related to control and the like, and returns the data block to the communication network. The temperature control unit 3 connected to the communication network acquires the information by receiving the data block.

In addition, if the data block includes a warning from the temperature control unit 3 that the heater 7 is disconnected (hereinafter, simply referred to as "warning"), the second communication unit 23 transmits the warning to the control unit 20. Also, if the data block includes temperature data (information indicating the temperature of an object that is subject to temperature adjustment) from the temperature input unit 4, the second communication unit 23 transmits the temperature data to the control unit 20.

The control unit 20 performs the overall control of the controller 2. The control unit 20 generates information regarding temperature adjustment (e.g., a control instruction or various parameters) by executing a user program read out from the storage unit 22, or using a method determined in advance for the apparatus in which the control unit 20 is included. Here, the "information regarding temperature adjustment" is information that is output by the controller 2, and is information that specifies driving and stopping of the heater 7. The control unit 20 outputs generated information via the second communication unit 23. Note that the control unit 20 may also adjust the content of the above information, for example, degrees of driving and stopping of the heater 7 based on temperature data acquired by reading the data included in a data block.

Temperature Control Unit 3

The temperature control unit 3 is a unit that gives an instruction to the SSR 8 according to information from the controller 2, through time proportional output (TPO). The temperature control unit 3 is also a unit that determines, based on the content of an instruction transmitted to the SSR 8 and a current value acquired from the CT 9, whether or not the heater 7 is disconnected, and if it is determined that the heater 7 is disconnected, transmits a warning to the controller 2. More specifically, the temperature control unit 3 includes an acquisition unit 30, an SSR control unit (instruction output unit) 32, a current value acquisition unit (measured value acquisition unit) 33, a determination unit 34, and a warning output unit 35.

The acquisition unit 30 acquires information from the controller 2, and transmits the information to the SSR control unit 32. The acquisition unit 30 may also acquire a warning event cancellation instruction (an instruction to cancel a warning to be described later) from the controller 2. If a warning event cancellation instruction is acquired, the acquisition unit 30 transmits the cancellation instruction to the warning output unit 35.

The SSR control unit 32 transmits an instruction to drive or stop the heater 7 to the SSR 8 in accordance with information acquired from the acquisition unit 30. Here, an instruction to drive the heater 7 and an instruction to stop the heater 7 are output using TPO. The current value acquisition unit 33 acquires, from the CT 9, the value of a current (current value) that is flowing in the heater 7 at the timing when the SSR control unit 32 transmits an instruction to the SSR 8, and transmits the current value to the determination unit 34.

The determination unit 34 determines, based on the content of an instruction (a driving instruction or a stop instruction) transmitted to the SSR 8 and the current value, whether or not the heater 7 is being driven and stopped according to the instruction, or whether or not the heater 7 is disconnected. More specifically, if the instruction transmitted to the SSR 8 is an instruction to drive the heater 7, and the current value acquired from the current value acquisition unit 33 is smaller than or equal to a predetermined disconnection determination threshold (a first threshold), the determination unit 34 determines that the heater 7 is disconnected. Note that the disconnection determination threshold is a value that is lower than a lower limit value of a current value when the heater 7 is being driven, and may be determined as appropriate. If it is determined that the heater 7 is disconnected, the determination unit 34 transmits the determination result to the warning output unit 35.

Upon receiving, from the determination unit 34, the result of the determination that the heater 7 is disconnected, the warning output unit 35 generates a warning, and outputs the warning to the controller 2. The warning that is output by the warning output unit 35 may be information to be handled as one kind of monitoring information by the controller 2 (monitoring information warning). The warning that is output by the warning output unit 35 may also be a warning (minor fault) that continues until some warning cancellation instruction is received from the controller 2.

SSR 8, CT 9, and Heater 7

The SSR 8 is a circuit for controlling start and stop (ON and OFF) of the heater 7. The SSR 8 drives or stops the heater 7 according to a driving instruction or a stop instruction received from the SSR control unit 32 of the temperature control unit 3. The CT 9 measures the value of a current that flows in the heater 7. In other words, it can be said that the CT 9 measures an actual operation of the heater 7. The CT 9 may directly measure the current that flows in the heater 7, or may indirectly measure the current that flows in the heater 7. The CT 9 transmits the measurement result to the current value acquisition unit 33 of the temperature control unit 3. The heater 7 warms an object such as a resin or water that is subject to temperature control. The configuration of the heater 7 is not limited as long as the heater 7 is electrically driven and can transfer heat to a target object.

Temperature Sensor 5 and Temperature Input Unit

The temperature sensor 5 measures the temperature of an object that is subject to temperature control, and transmits the temperature to the temperature input unit 4. The temperature input unit 4 outputs temperature data indicating the temperature to the controller 2.

In the examples in FIGS. 1 and 2, the determination unit 34 is configured to determine whether or not one apparatus, namely the heater 7 is disconnected. However, in the output control system 100 according to the invention, a configuration may also be adopted in which the determination unit 34 determines whether or not each of a plurality of apparatuses are disconnected, and the warning output unit 35 may output, to the controller 2, a warning that makes it possible to distinguish which apparatus is disconnected.

To be more specific, for example, assuming that the output control system 100 has a plurality of electric circuits that are each constituted by an SSR 8, a CT 9, and a heater 7 (and a heater power supply) as shown in FIG. 2, the SSR control unit 32 gives instructions individually to the plurality of SSRs regarding driving or stopping. The current value acquisition unit 33 then acquires the individual values of the currents flowing in the heaters that are switched between driving and stopping by the SSRs, from CTs that are respectively connected to the heaters, and the determination unit 34 performs disconnection determination for each of the heaters. The warning output unit 35 then outputs different warnings for the different heaters. This makes it possible to individually detect disconnection of a plurality of heaters, and give warnings.

Method for Determining Heater Disconnection

Figure 3A:
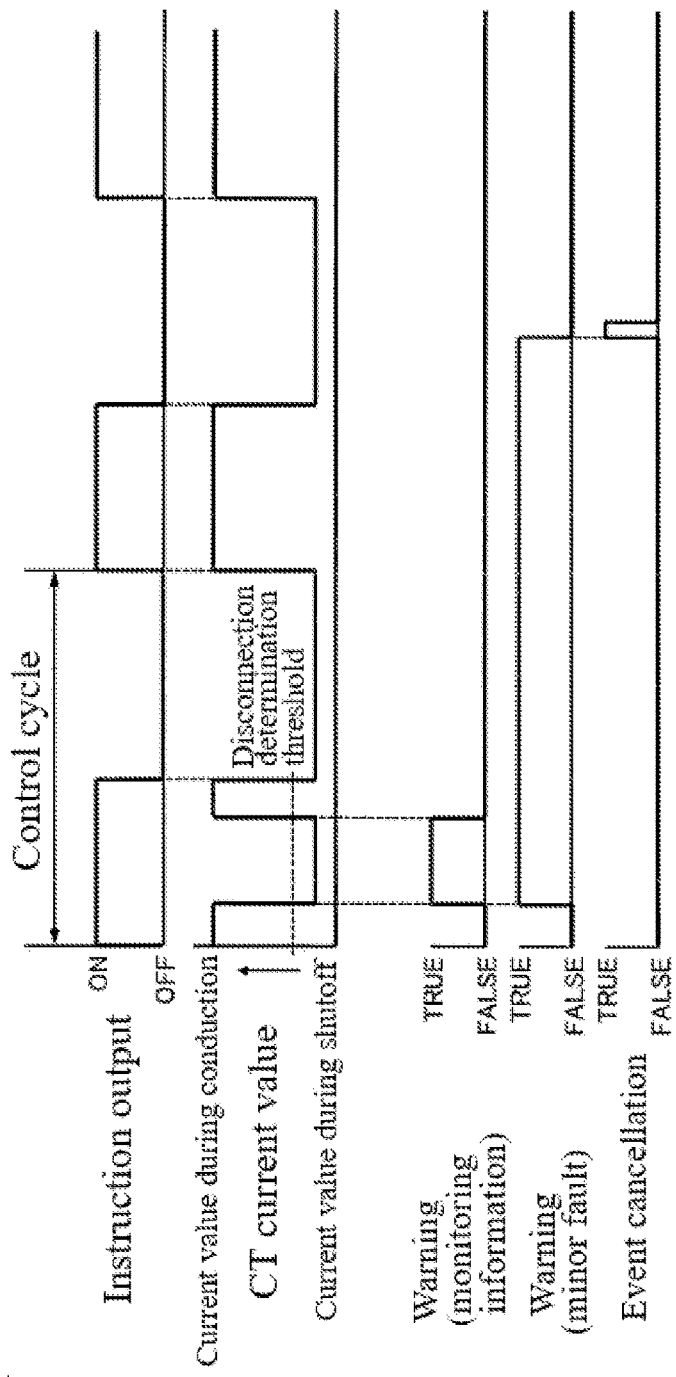
FIG. 3A is a timing chart showing temporal change of input/output parameters in a temperature control unit included in the above-described output control system.

Next, the determination that is performed by the determination unit 34 will be described more specifically with reference to FIGS. 3A and 3B. FIG. 3A is a timing chart showing the temporal change of input/output parameters in the temperature control unit 3.

The graph "instruction output" indicates timings of instruction output from the SSR control unit 32 to the SSR 8 and the change of the instruction. "ON" represents an instruction to drive the heater 7, and "OFF" represents an instruction to stop the heater 7. The graph "CT current value" indicates the change in a current value that is acquired by the current value acquisition unit 33 from the CT 9. Here, "current value during shutoff" refers to a current value when the heater 7 is being stopped. On the other hand, "current value during conduction" refers to a current value when the heater 7 is being driven. In addition, as described above, the "disconnection determination threshold" is a value that is lower than the lower limit value of a current value when the heater 7 is being driven, and is determined as appropriate.

The graph "warning (monitoring information)" and the graph "warning (minor fault)" each show a timing when the warning output unit 35 outputs a warning. The graph "warning (monitoring information)" indicates a case where a monitoring information warning is output, and the graph "warning (minor fault)" indicates a case where a minor fault warning is output.

The graph "event cancellation" indicates a timing when the acquisition unit 30 acquires a warning event cancellation instruction from the controller 2 if the warning output unit 35 outputs a minor fault warning. Note that, if a monitoring information warning is output, a cancellation instruction as shown in this graph is not acquired.

As described above, the SSR control unit 32 transmits a driving instruction and a stop instruction to the SSR 8 through TPO. In other words, a pair of a period during which output of a driving instruction continues and a period during which output of a stop instruction continues is one control cycle. Here, if, as indicated by the first control cycle in FIG. 3A, a current value (i.e., a current value measured by the CT 9) acquired by the current value acquisition unit 33 is smaller than the disconnection determination threshold when the SSR control unit 32 is outputting a driving instruction, the determination unit 34 determines that the heater 7 is disconnected, and the warning output unit 35 outputs a monitoring information warning or a minor fault warning to the controller 2, based on this determination. In addition, if a minor fault warning is output to the controller 2, the control unit 20 of the controller 2 acquires the above warning, and outputs a warning event cancellation instruction to the acquisition unit 30 of the temperature control unit 3 if a predetermined condition is satisfied (e.g., if any measures have been taken to address the warning). Upon receiving the cancellation instruction, the acquisition unit 30 transmits this instruction to the warning output unit 35. Upon receiving the event cancellation instruction, the warning output unit 35 stops outputting the minor fault warning.

Note that, if the current value received from the current value acquisition unit 33 is continuously smaller than the disconnection determination threshold for a predetermined number of times, the determination unit 34 may determine that the heater 7 is disconnected. FIG. 3B shows "CT current value" and the "warning" graphs (both monitoring information and minor fault warning) in more detail. One dot of the graph "CT current value" represents a timing when the CT 9 samples a current value. In addition, the solid lines in the "warning" graphs indicate output timings of the monitoring information warning, and the broken lines indicate output timings of the minor fault warning.

Figure 3B:
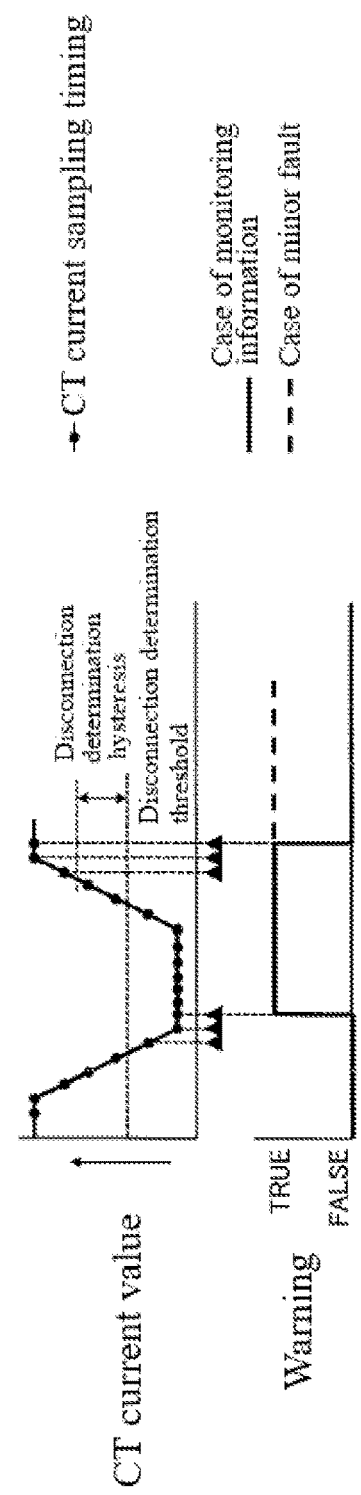
FIG. 3B is a timing chart showing a portion of FIG. 3A in more detail.

As shown in FIG. 3B, if, after determining that the heater 7 is disconnected, a current value received from the current value acquisition unit 33 reaches a value larger than or equal to the disconnection determination threshold+a predetermined buffer value (a disconnection determination hysteresis value in FIG. 3B) a predetermined number of times, the determination unit 34 may determine that the heater 7 is not disconnected. In this manner, by determining whether or not the heater 7 is disconnected, based on a predetermined number of current values, the determination unit 34 can reduce erroneous determinations.

Flow of Warning Output Processing

Figure 4:
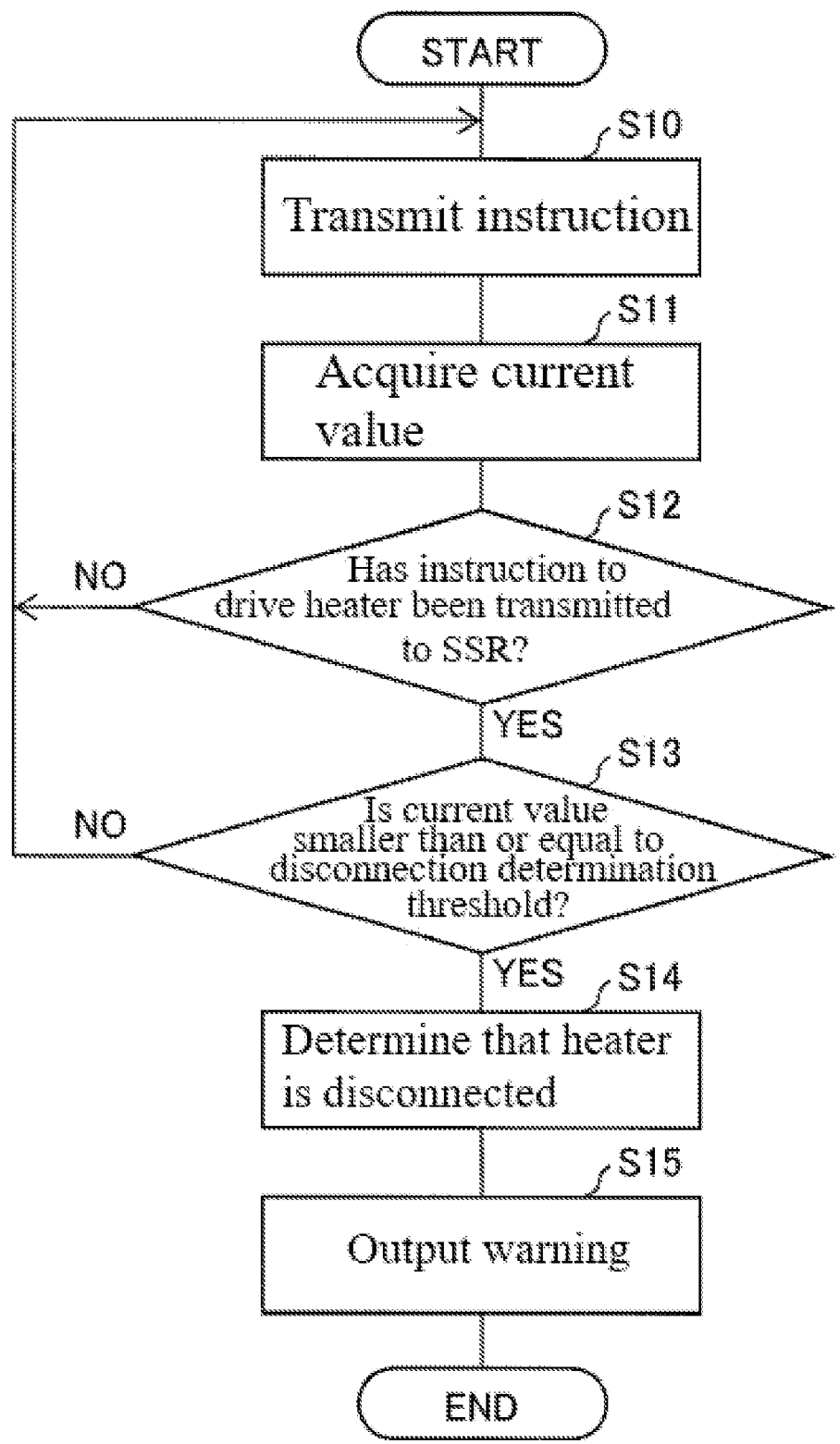
FIG. 4 is a flowchart showing a flow of warning output processing that is performed by the above-described temperature control unit.

Lastly, in this embodiment, the flow of processing of the temperature control unit 3 outputting a warning (warning output processing) will be described with reference to FIG. 4. FIG. 4 is a flowchart showing the flow of warning output processing.

When information regarding temperature adjustment is acquired from the controller 2, the acquisition unit 30 of the temperature control unit 3 transmits the information to the SSR control unit 32. The SSR control unit 32 generates an instruction to drive or stop the heater 7 according to the information, and transmits the instruction to the SSR 8 (step S10) and the determination unit 34. On the other hand, at the timing when the SSR control unit 32 transmits the instruction to the SSR 8, the current value acquisition unit 33 acquires a current value from the CT 9 (step S11). The current value acquisition unit 33 transmits the acquired current value to the determination unit 34.

If an instruction for the SSR control unit 32 to drive the heater 7 has been transmitted (YES in step S12), and the current value received from the current value acquisition unit 33 is smaller than or equal to the disconnection determination threshold (YES in step S13), the determination unit 34 determines that the heater 7 is disconnected (step S14).

The determination unit 34 transmits the determination result to the warning output unit 35. The warning output unit 35 generates a warning based on the determination result received from the determination unit 34, and outputs the warning (step S15).

On the other hand, if the SSR control unit 32 has transmitted an instruction to stop the heater 7 (NO in step S12), or the current value received from the current value acquisition unit 33 is larger than the disconnection determination threshold (NO in step S13), the determination unit 34 determines that the heater 7 is being properly controlled, and then waits until it receives an instruction and a current value from the SSR control unit 32 and the current value acquisition unit 33, respectively.

According to the above-described processing, the temperature control unit 3 can determine whether or not the heater 7 is being driven or stopped according to an instruction to the SSR 8, based on the content of the instruction to the SSR 8, namely, whether it is an instruction to drive the heater 7 or an instruction to stop the heater 7, and the value of the current that flows in the heater 7. If the heater 7 is not properly driven or stopped, it is possible to output a warning to the controller 2, which performs output control upstream of the temperature control unit 3.

In addition, according to the above-described processing, compared with the case where the SSR 8 monitors and determines whether or not the heater 7 is being properly driven or stopped, it is possible to reduce the cost for introducing the SSR 8. In addition, it is not required to wire the SSR 8 and the CT 9, and thus it is possible to reduce the man-hours for wiring. Furthermore, it is possible to save the trouble for various settings in the SSR 8 regarding monitoring of the heater 7. Therefore, the temperature control unit 3 can find an abnormality in the heater 7 with a simpler configuration, and warn the controller 2.

Note that, in this embodiment, if a current value acquired by the current value acquisition unit 33 is larger than or equal to a predetermined threshold (second threshold) at the timing when the SSR control unit 32 is outputting an instruction to stop the heater 7, to the SSR 8, the determination unit 34 may determine that the heater 7 is not being properly controlled due to a problem such as break-down of the SSR 8. A configuration may also be adopted in which the determination unit 34 then informs the warning output unit 35 of the determination result, and the warning output unit 35 outputs a warning to the controller 2.

Furthermore, the warning output unit 35 may output different warnings (warnings that can be distinguished by the controller 2) for a case where the determination unit 34 determines that "the heater 7 is disconnected" and a case where the determination unit 34 determines that "the SSR 8 is broken down".

In addition, in this embodiment, the temperature control unit 3 may be connected to an output apparatus for notifying the user of a warning. The output apparatus may be a speaker, a microphone, or the like. The warning output unit 35 of the temperature control unit 3 may also output a warning via the connected output apparatus instead of outputting a warning to the controller 2, or in addition to outputting a warning to the controller 2.

Accordingly, the temperature control unit 3 can cause the output apparatus to output a warning generated by the temperature control unit 3 without an instruction of the controller 2. Even if one of the devices upstream of the temperature control unit 3, for example, the controller 2 or the programmable display device 1 breaks down, and a warning is not successfully transmitted to the upstream device, it is possible to notify the user of the warning.

Second Embodiment

A configuration may also be adopted in which the temperature control unit 3 according to the invention acquires, from the controller 2, an operation amount indicating the ratio of a time during which an output apparatus is driven per unit of time, and performs time proportional output (TPO) of an instruction to drive or stop the heater 7 to the SSR 8 such that a constant cycle and the time ratio indicated by the operation amount can be realized. A second embodiment of the invention will be described below with reference to FIG. 5. Note that from this embodiment onward, for convenience of description, the same reference numerals are assigned to members having the same functions as the members described in the first embodiment, and their further description is omitted.

In this embodiment, a control unit 20 of a controller 2 outputs an operation amount to a temperature control unit 3 via a second communication unit 23. Specifically, the second communication unit 23 adds the value of an operation amount to a data block, and returns the data block to the communication network. Here, "operation amount" refers to a value designating the ratio of a time during which the heater 7 is driven when the SSR 8 drives the heater 7. In the following description, as an example, the control unit 20 determines, as an operation amount, a value that indicates the ratio of a time during which the heater 7 is driven, and is expressed as a percentage (%), and outputs the value.

An acquisition unit 30 of the temperature control unit 3 acquires the above-described operation amount, and transmits the operation amount to an SSR control unit 32. The SSR control unit 32 performs time proportional output (TPO), to the SSR 8, in which a driving instruction and a stop instruction are combined, such that the time ratio indicated by the above-described operation amount can be realized.

Figure 5:
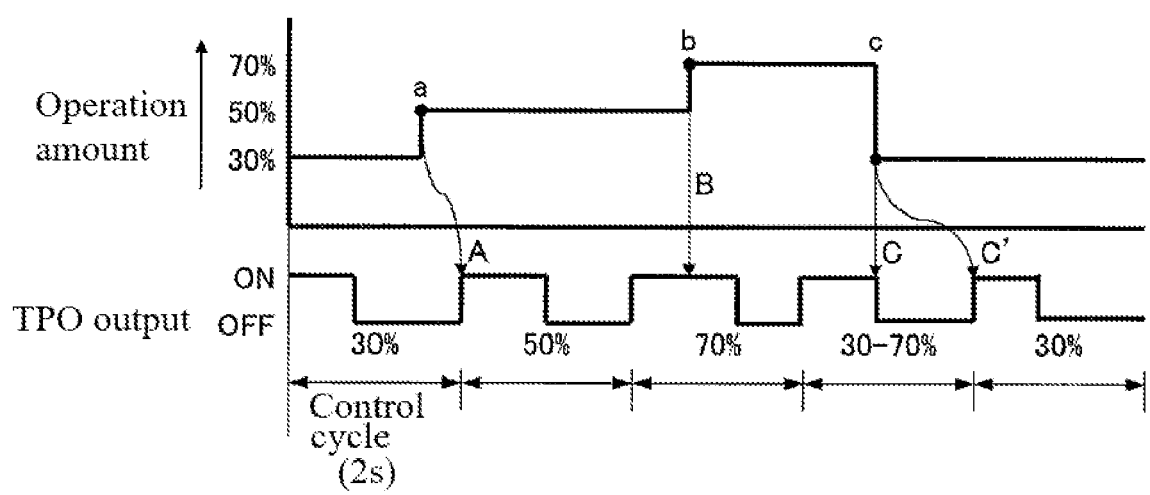
FIG. 5 is a timing chart showing change in an operation amount and change in instruction output of a temperature control unit according to a second embodiment.

FIG. 5 is a timing chart showing the change in an operation amount that is acquired by the acquisition unit 30 (instructed by the control unit 20 of the controller 2) and the change in instruction output of the SSR control unit 32. As illustrated, the graph "operation amount" indicates the value (%) of the operation amount acquired by the acquisition unit 30. In addition, the graph "TPO output" indicates the content of an instruction (ON or OFF of the heater 7) that is transmitted (output) by the SSR control unit 32 to the SSR 8 through TPO and the period of TPO. In addition, points a to c indicate timings when the operation amount changes, and arrows A to C indicate timings when changes in operation amount at the corresponding points a to c are reflected.

As illustrated, when an operation amount that is acquired by the acquisition unit 30 changes, the SSR control unit 32 reflects the changed operation amount in the current TPO control cycle or the next control cycle.

More specifically, if the operation amount changes at the timing when the SSR control unit 32 is outputting a stop instruction (point a in FIG. 5), it suffices for the SSR control unit 32 to perform TPO during a driving time that is based on the changed operation amount, from the next control cycle (arrow A in FIG. 5). In addition, if the operation amount changes at the timing when the SSR control unit 32 is outputting a driving instruction (point b in FIG. 5), it suffices for the SSR control unit 32 to adjust the period during which a driving instruction is output, and perform TPO such that the ratio of the driving time of the heater 7 in the current control cycle matches the time ratio indicated by the changed operation amount (arrow B in FIG. 5).

In addition, if the operation amount changes at the timing when the SSR control unit 32 is outputting a driving instruction, and, in the control cycle at this time, a driving time larger than or equal to a driving time indicated by the changed operation amount has already elapsed (point c in FIG. 5), it suffices for the SSR control unit 32 to output an immediate stop instruction, and continue outputting a stop instruction during the remaining time of the control cycle (arrow C in FIG. 5). In this case, the changed operation amount will be accurately reflected from the next control cycle (arrow C' in FIG. 5).

Thus, even if an operation amount is determined without taking the cycle time of the control unit 20 and the TPO control cycle into consideration, there is the effect, that the operation amount can be appropriately reflected in TPO by the temperature control unit 3 acquiring the value of the operation amount from the controller 2, and the SSR control unit 32 performing TPO, as described above.

Third Embodiment

In addition, the temperature control unit 3 according to the invention may also acquire, from the controller 2, first information regarding driving and stopping of the heater 7 and second information indicating whether or not to autonomously control TPO to the SSR 8. In addition, the temperature control unit 3 may also output an instruction to drive or stop the heater 7 to the SSR 8 through TPO in accordance with the first information and second information.

Here, for example, the first information may be the operation amount described in the above embodiments, or may be a control instruction to turn on (drive) the heater 7, or to turn off (stop) the heater 7. Note that the second information will be described in this embodiment.

The third embodiment of the invention will be described below with reference to FIG. 6. A controller 2 according to this embodiment is different from the controller 2 according to the first and second embodiments in that an operation amount (first information) and information (second information) indicating whether an immediate output instruction is ON or OFF are transmitted to a temperature control unit 3. Also, the temperature control unit 3 is different from the temperature control unit 3 according to the first and second embodiments in that a method for controlling TPO to an SSR 8 is changed in accordance with the above-described operation amount and whether the above-described immediate output instruction is ON or OFF.

Here, "immediate output instruction" is information that takes two values, namely ON and OFF, and is information indicating whether or not to cause the temperature control unit 3 to autonomously control TPO to the SSR 8. In the following description, if the immediate output instruction is ON, the temperature control unit 3 does not autonomously control TPO, and if the immediate output instruction is OFF, the temperature control unit 3 autonomously controls TPO.

Here, "autonomously controlling TPO" refers to the temperature control unit 3 determining start and end timings of TPO to the SSR 8 as well as a TPO control cycle based on the internal information of the temperature control unit 3 itself, for example. If the immediate output instruction is ON, the temperature control unit 3 cyclically acquires, via data blocks, instructions to start and end TPO or information indicating the start and end timings that have been output from the controller 2. The temperature control unit 3 then changes start and end of TPO and the TPO control cycle in accordance with these instructions or information.

Conversely, "not autonomously controlling TPO" refers to the temperature control unit 3 determining at least one of start and end timings of TPO to the SSR 8 and the TPO control cycle based on information (e.g., a control instruction or various parameters) that is acquired from the controller 2, for example.

In addition, the control unit 20 may also have an auto-tuning function for auto-tuning the heater 7. "Auto-tuning function" as mentioned in this embodiment refers to a function for calculating various parameters related to output control such as PID control that is executed by the controller 2.

Furthermore, a configuration may also be adopted in which, in the case of executing auto-tuning, the controller 2 stores, in a data block, the value ON as the value of the immediate output instruction, and outputs this block. In addition, a configuration may also be adopted in which, in the case of not executing auto-tuning, the controller 2 stores, in a data block, the value OFF as the value of the immediate output instruction, and outputs this block. Below, it is assumed that, in the case of executing auto-tuning, the controller 2 stores, in a data block, the value ON as the value of the immediate output instruction, and in the case of not executing auto-tuning, stores, in a data block, the value OFF as the value of the immediate output instruction.

In addition, if the value of an immediate output instruction read out from a data block is ON, and an operation amount has changed, the temperature control unit 3 may also update the TPO control cycle from the temperature control unit 3 to the SSR 8.

Figure 6:
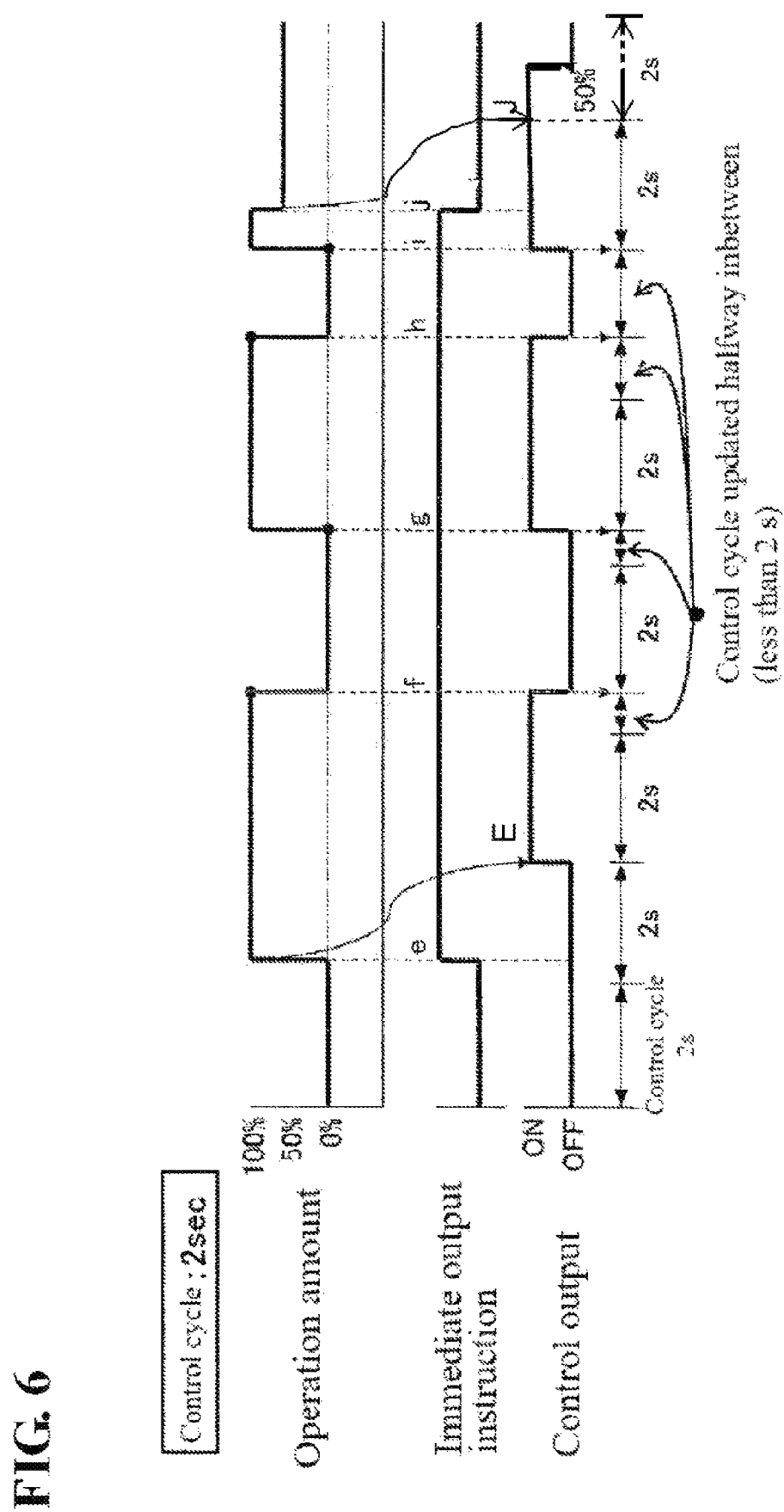
FIG. 6 is a timing chart showing changes in an operation amount and an immediate output instruction that are output from a controller according to a third embodiment, and time proportional output (TPO) in a temperature control unit according to the third embodiment and a control cycle thereof.
Figure 7:
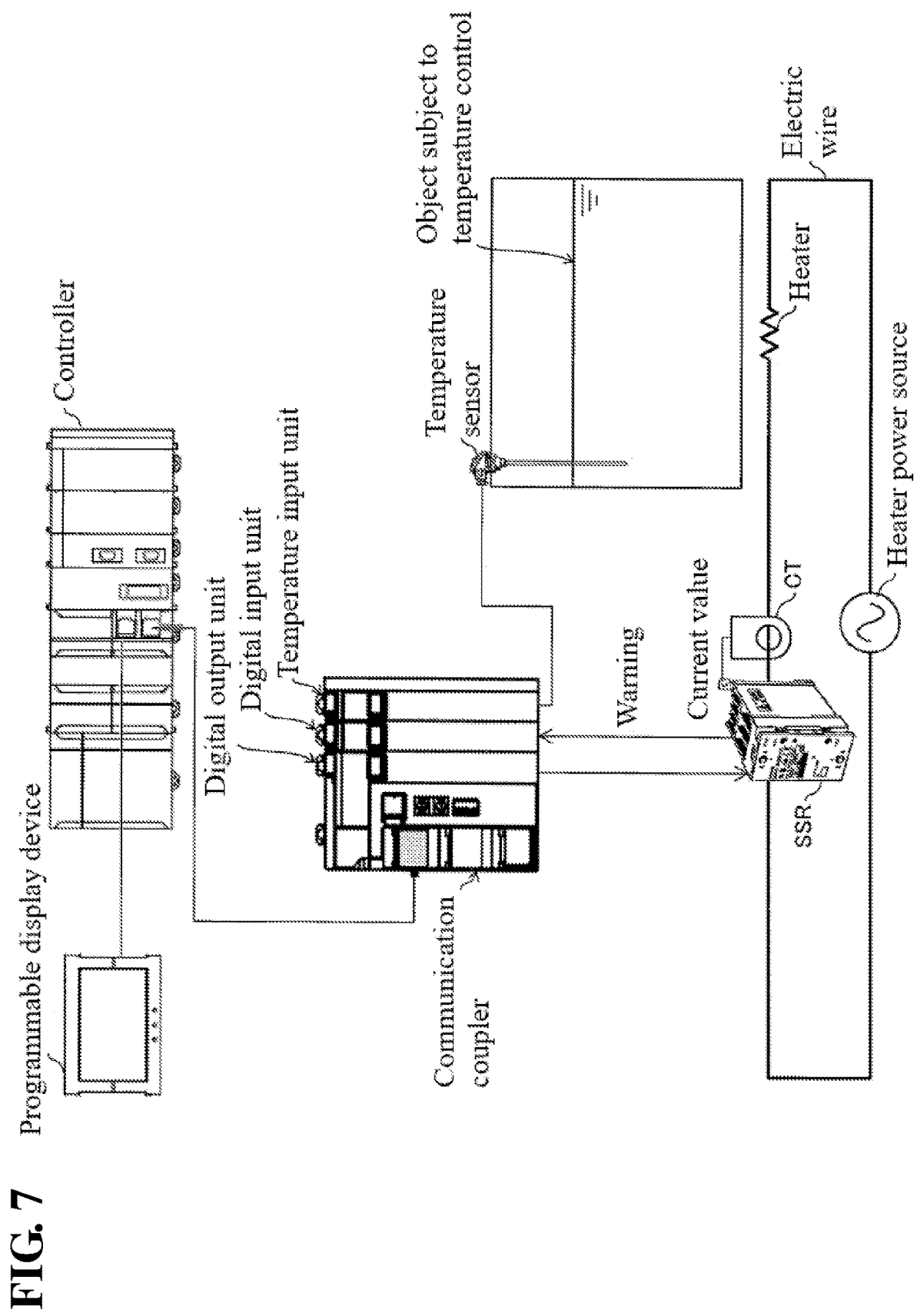
FIG. 7 is a diagram showing an outline of a conventional output control system.

FIG. 6 is a timing chart showing changes in an operation amount and an immediate output instruction (second information) that are output from the control unit 20 of the controller 2, and TPO in an SSR control unit 32 of the temperature control unit 3 and its control cycle.

When the immediate output instruction that is output from the controller 2 is ON (i.e., when the control unit 20 of the controller 2 is executing auto-tuning), if an operation amount that is output from the controller 2 along with the immediate output instruction changes, the SSR control unit 32 updates the control cycle and starts one new control cycle even if the current TPO has not been performed for a complete period (in FIG. 6, a complete period corresponds to two seconds (s)) of one control cycle (points f, g, h, and i in FIG. 6).

Note that, if a timing when the immediate output instruction changes to ON and a timing when the operation amount changes are the same (point e FIG. 6), the SSR control unit 32 may update the control cycle as described above, or may reflect the changed operation amount at the timing when the next control cycle begins, without updating the control cycle (an arrow E in FIG. 6).

In addition, if the timing when the immediate output instruction changes to OFF and the timing when the operation amount changes are the same (point j in FIG. 6), the SSR control unit 32 may also update the control cycle as described above, or may also reflect the changed operation amount at the timing when the next control cycle begins, without updating the control cycle (arrow J in FIG. 6).

As described above, if the operation amount changes while auto-tuning is being executed, the temperature control unit 3 can ensure that auto-tuning is more accurately performed (more accurately calculate various parameters) on the controller 2, by reflecting the change without waiting for the next control cycle.

Particularly when the period of one control cycle is long, and reflection of a change in the operation amount is carried over to the next control cycle, there are cases where there are deviations in the calculation of the above-mentioned parameters. More specifically, for example, in the case of a cooling device such as a fan, instead of the heater 7, one control cycle is often long, for example, 20 s. In this case, if a change of the operation amount is reflected in the next control cycle, the controller 2 will perform auto-tuning that is based on the operation amount before the change, for a period of up to 20 s, and various parameters that are calculated may vary.

By contrast, if the control unit 20 of the controller 2 is executing auto-tuning, and the operation amount that is output by the controller 2 changes, then the temperature control unit 3 according to this embodiment updates the TPO control cycle, and resumes TPO based on the changed operation amount. In other words, it can be said that the changed operation amount is immediately reflected. Accordingly, the temperature control unit 3 has the effect that it is able to cause the controller 2 to more accurately execute auto-tuning.

In addition, when the operation amount changes from 1% or more to 0%, the SSR control unit 32 of the temperature control unit 3 may also instruct the SSR 8 to stop the heater 7 at the timing when the operation amount changes, regardless of the TPO control cycle. Furthermore, when the operation amount changes from 1% or more to 0%, the SSR control unit 32 may also instruct the SSR 8 to stop the heater 7 at the timing when the operation amount changes, regardless of whether the immediate output instruction is ON or OFF.

Accordingly, when the heater 7 is to be stopped, the SSR control unit 32 can transmit, to the SSR 8, an instruction to immediately stop the heater 7 regardless of the cycle of TPO. Therefore, the temperature control unit 3 can more quickly reflect the operation amount received from the controller 2.

In addition, if a plurality of SSRs 8 are connected to the temperature control unit 3, it is desirable that the controller 2 controls at least one of start and end of TPO between the temperature control unit 3 and each of the SSRs 8 and the TPO control cycle, in a distinguished manner (i.e. individually).

In addition, if the temperature control unit 3 is performing TPO to each of a plurality of SSRs 8, and the controller 2 is to output (or is outputting) the value ON as an immediate output instruction, the controller 2 may further transmit, to the temperature control unit 3, information indicating a start timing of TPO to each of the SSRs 8. It is desirable that the acquisition unit 30 of the temperature control unit 3 then acquires the above-described information indicating the timing, and starts TPO of each of the SSRs 8 at the timing indicated by the information indicating the start timing.

More specifically, a configuration may also be adopted in which the controller 2 adds, in a data block, a value (delay value) indicating the time by which a start timing of TPO to each of the SSRs 8 is to be delayed from the original start timing of TPO, as the above-described information indicating the start timing, and outputs the data block. A configuration may also be adopted in which the temperature control unit 3 then reads the delay value, and delays the start timing of each TPO by the time indicated by the delay value.

For example, assume that one temperature control unit 3 is connected to a plurality of SSRs 8, and the SSRs 8 are each connected to one or more heaters 7. In this case, if TPOs to all of the SSRs 8 are turned ON at the same time, there was a risk that an excessive current flows in the temperature control unit 3, causing a malfunction.

By contrast, in the controller 2 and the temperature control unit 3 according to this embodiment, for example, by the controller 2 instructing different start timings of TPO between the temperature control unit 3 and the respective SSRs 8 (e.g., different delay values of TPO to the SSRs 8), it is possible to prevent an excessive electric current from flowing as described above.

MODIFIED EXAMPLE

In the above embodiments, a system for adjusting the temperature of a certain target object by controlling driving of the heater 7 has been described. However, the output control system 100 according to the invention can be applied to not only temperature adjustment but also various types of output control.

For example, a configuration may also be adopted in which the output control system 100 according to the invention has a burner in place of the heater 7, and performs temperature adjustment of a target object (e.g., water or metal) by controlling driving (ON) and stopping (OFF) of the burner. In this case, the SSR 8 (and the CT 9) may also be a control motor that has a function similar to that of the SSR 8 (and the CT 9).

In addition, a configuration may also be adopted in which the output control system 100 according to the invention has a tank filled with a coolant (e.g., water) in place of the heater 7, and performs temperature adjustment of a target object by adjusting the area of the coolant that comes into contact with the target object, or adjusting the flow rate of the coolant. In this case, the SSR 8 (and the CT 9) may also be a valve mechanism for adjusting the area of the coolant that comes into contact with the target object, the flow rate, and the like, the valve mechanism including a control function similar to that of the SSR 8 (and the CT 9).

In addition, a configuration may also be adopted in which the output control system 100 according to the invention has a fan in place of the heater 7, and performs temperature adjustment of a target object by controlling driving and stopping of the fan. In this case, the SSR 8 (and the CT 9) may also be a mechanism that has a control function similar to that of the SSR 8 (and the CT 9), and controls driving, stopping, the rotation frequency, and the like of the fan.

In addition, a configuration may also be adopted in which the output control system 100 according to the invention has a Peltier element in place of the heater 7, and performs temperature adjustment of a target object by controlling the Peltier element. In this case, the SSR 8 (and the CT 9) may also be a Peltier controller that has a control function similar to that of the SSR 8 (and the CT 9).

Realization Example Using Software

The controller 2 and control blocks of the temperature control unit 3 (in particular, the control unit 20, the acquisition unit 30, the SSR control unit 32, the current value acquisition unit 33, the determination unit 34, and the warning output unit 35) may also be realized by logic circuits (hardware) formed on an integrated circuit (IC chip), or may also be realized by software using a CPU (central processing unit).

In the case of the latter, the controller 2 and the temperature control unit 3 have a CPU that executes an instruction of a program that is software for realizing each function, a ROM (read only memory) or a storage apparatus (these are referred to as "recording media") that stores the program and various types of data in a computer-readable (or CPU-readable) manner, a RAM (random access memory) to which the program is loaded, and the like. An advantage of some aspects of the invention is then achieved by a computer (or a CPU) reading the above-described program from the above-described recording medium, and executing the program. A "non-transitory tangible medium" such as a tape, a disk, a card, a semiconductor memory, and a programmable logic circuit can be used as the above-described recording medium. In addition, the above-described program may also be supplied to the above-described computer via any transmission medium (e.g., a communication network or broadcast wave) that can transmit the program. Note that the invention can also be realized in form of data signals that are obtained by embodying the above-described program through electric transmission, and are embedded in carrier waves.

An output control unit according to one aspect of the present invention is connected to a switching apparatus that switches between driving and stopping of an output apparatus, and has an acquisition unit that acquires, from a control apparatus, first information regarding driving and stopping of the output apparatus and second information indicating whether or not to subject a time proportional output to the switching apparatus to autonomous control, and an instruction output unit that performs time proportional output of an instruction to drive or stop the output apparatus, to the switching apparatus in accordance with the first information and the second information.

A control method of an output control unit according to one aspect of the invention is a control method of an output control unit connected to a switching apparatus that switches between driving and stopping of an output apparatus, and includes an acquisition step of acquiring, from a control apparatus, first information regarding driving and stopping of the output apparatus and second information indicating whether or not to subject a time proportional output to the switching apparatus to autonomous control, and an instruction output step of performing time proportional output of an instruction to drive or stop the output apparatus, to the switching apparatus in accordance with the first information and the second information.

According to this configuration, the output control unit can determine whether or not the output control unit itself autonomously controls time proportional output according to information acquired from the control apparatus. Accordingly, the user can choose between the output control unit itself controlling time proportional output that is performed by the output control unit, and the control apparatus that is an upstream device controlling time proportional output that is performed by the output control unit, depending on the situation. For example, it is possible to choose between a control method that can be used when the control apparatus controls time proportional output and a control method that can be used when the output control unit controls its output. Accordingly, according to the configuration, the output control unit can appropriately control time proportional output depending on the situation.

In addition, in the output control unit, if the second information indicates that the time proportional output is not autonomously controlled, the instruction output unit may update the cycle of the time proportional output at the timing when the first information changes.

According to this configuration, if first information changes when the output control unit itself does not autonomously control time proportional output, the output control unit resumes time proportional output based on the changed first information. In other words, it can be said that the changed first information is quickly reflected in an instruction to the switching apparatus. Therefore, the output control unit can more quickly reflect first information received from the control apparatus.

Moreover, in the output control unit, if the first information changed to information indicating that the output apparatus is to be stopped, the instruction output unit may instruct the switching apparatus to stop the output apparatus at the timing when the first information changed, regardless of the cycle of the time proportional output.

According to this configuration, when the output apparatus is to be stopped, the output control unit can transmit an instruction to immediately stop the output apparatus, to the switching apparatus regardless of the cycle of time proportional output. Therefore, the output control unit can more quickly reflect the first information received from the control apparatus.

In addition, in the output control unit, the acquisition unit may also periodically acquire the first information and the second information from the control apparatus. Accordingly, the output control unit can perform time proportional output without being affected by the acquisition cycle of the information.

In addition, in the output control unit, the acquisition unit may also be connected to the control apparatus via a field network. In the case of performing communication using a field network, there are cases where communication is cyclically performed. However, according to this configuration, the output control unit can perform time proportional output without being affected by the communication cycle.

In addition, a configuration may also be adopted in which, in the output control unit, the instruction output unit performs the time proportional output for each of a plurality of switching apparatuses, and if the second information indicates that the time proportional output is not autonomously controlled, the acquisition unit acquires, from the control apparatus, information indicating start timings of the time proportional outputs to the respective switching apparatuses, and the instruction output unit starts the time proportional outputs to the switching Apparatuses at timings that are based on the information indicating the start timings.

For example, if time proportional outputs to a plurality of switching apparatus are started at the same time, and an instruction to drive output apparatuses is transmitted, the output apparatuses are driven at the same time, and there is a risk that an overcurrent will flow in the output control unit. By contrast, according to the configuration, the output control unit can start time proportional outputs to switching apparatuses according to start timings determined in the control apparatus. Therefore, for example, by setting the information indicating start timings in the control apparatus so as to vary the timings, the user can avoid a situation in which an overcurrent flows as described above.

An output control system according to one aspect of the invention includes the output control unit and the control apparatus. Accordingly, it is possible to realize an output control system that can appropriately control time proportional output that is performed by the output control unit, depending on the situation.

An output control unit according to one aspect of the present invention includes an acquisition unit that acquires, from a control apparatus that has a function for calculating various parameters for controlling output of an output apparatus, a control instruction related to output of the output apparatus and information indicating whether or not calculation of the parameters is being executed, and an instruction output unit that performs time proportional output of an instruction to drive or stop the output apparatus, to a switching apparatus that switches between driving and stopping of the output apparatus in accordance with the control instruction, and if the control instruction that is acquired by the acquisition unit changes when the information that is acquired by the acquisition unit indicates that the control apparatus is calculating the parameters, the instruction output unit updates a cycle of the time proportional output at the timing of the change.

In addition, a control method of an output control unit according to one aspect of the present invention includes an acquisition step of acquiring, from a control apparatus that has a function for calculating various parameters for controlling output of an output apparatus, a control instruction related to output of the output apparatus and information indicating whether or not calculation of the parameters is being executed, and an instruction output step of performing time proportional output of an instruction to drive or stop the output apparatus, to a switching apparatus that switches between driving and stopping of the output apparatus in accordance with the control instruction, and if the control instruction that is acquired in the acquisition step changes when the information that is acquired in the acquisition step indicates that the control apparatus is calculating the parameters, a cycle of the time proportional output is updated at the timing of the change in the instruction output step.

In a conventional output control unit, there have been cases where reflection of changes in first information is carried over to the next control cycle of time proportional output, and there are deviations in the calculation of the parameters. If the period of one control cycle of time proportional output is long, the deviations are more significant. More specifically, for example, when performing output control of a cooling device such as a fan that is an output apparatus, one control cycle is often long, for example, 20 seconds. In this case, if a change in first information is to be reflected on the next control cycle, the fan is controlled (driven or stopped) for a period of up to 20 seconds according to first information before the change. The control apparatus then performs auto-tuning based on a measured parameter (e.g., the temperature of a target object that is being cooled by the fan) in a state where output control is performed based on the first information before the change. Therefore, that was a problem in that there are large deviations in the calculation of various parameters.

By contrast, according to the above-described configuration and processing, if a control instruction changes during a period during which the control apparatus is executing a function for calculating various parameters for controlling output (auto-tuning), the output control unit updates the control cycle of time proportional output, and resumes time proportional output based on the changed control instruction. Accordingly, it can be said that the changed control instruction is immediately reflected. Accordingly, the output control unit has the effect that it is able to cause the control apparatus to more accurately perform auto-tuning.

The invention is not limited to the above embodiments, and various modifications can be made within the scope of claims, and an embodiment acquired by appropriately combining technical means disclosed in different embodiments is also included in the technical scope of the invention.

LIST OF REFERENCE NUMERALS

1 Programmable display device
2 Controller (control apparatus)
20 Control unit

21 First communication unit
22 Storage unit
23 Second communication unit
3 Temperature control unit
30 Acquisition unit
32 SSR control unit (instruction output unit)
33 Current value acquisition unit
34 Determination unit
35 Warning output unit
4 Temperature input unit
5 Temperature sensor
7 Heater (output apparatus)
8 SSR (switching apparatus)
9 CT

The invention claimed is:

1. An output control unit connected to a switching apparatus that switches between driving and stopping of an output apparatus, the output control unit comprising a processor configured with a program to perform operations comprising:
operation as an acquisition unit configured acquire, from a control apparatus, an operation amount comprising a ratio of time during which the output apparatus is driven to time during which the output apparatus is stopped, an immediate output instruction indicating whether the output control unit autonomously controls a time proportional output of an instruction to drive or stop the output apparatus that is output to the switching apparatus or does not autonomously control the time proportional output of the instruction; and
operation as an instruction output unit configured to output the time proportional output of the instruction to drive or stop the output apparatus to the switching apparatus in accordance with the operation amount and the immediate output instruction, wherein
the processor is configured with the program to perform operations such that operation as the instruction output unit comprises:
in response to the immediate output instruction indicating that the output control unit autonomously controls the time proportional output and the operation amount changing, updating, at a beginning of a next control cycle, start and end times of the time proportional output based on the operation amount; and
in response to the immediate output instruction indicating that the output control unit does not autonomously control the time proportional output and the operation amount changing, updating the start and end times of the time proportional output of the instruction immediately in accordance with the operation amount.

2. The output control unit according to claim 1,
wherein the processor is configured with the program to perform operations such that operation as the instruction output unit comprises, in response to the immediate output instruction indicating that the time proportional output is not to be autonomously controlled, updating a cycle of the time proportional output at a time when the operation amount changes.

3. The output control unit according to claim 2,
wherein the processor is configured with the program to perform operations such that operation as the instruction output unit comprises, if the operation amount changes to information indicating stop of the output apparatus, instructing the switching apparatus to stop the output apparatus at a time when the operation amount changes regardless of the cycle of the time proportional output.

4. The output control unit according to claim 2,
wherein the processor is configured with the program to perform operations such that operation as the acquisition unit comprises periodically acquiring the operation amount and the immediate output instruction from the control apparatus.

5. The output control unit according to claim 2,
wherein the processor is configured with the program to perform operations such that operation as the acquisition unit connects to the control apparatus via a field network.

6. The output control unit according to claim 2,
wherein the processor is configured with the program to perform operations such that:
operation as the instruction output unit comprises operations as the instruction output unit configured to subject a plurality of switching apparatuses to the time proportional output,
operation as the acquisition unit comprises, in response to the immediate output instruction indicating that the time proportional output is not to be autonomously controlled, acquiring, from the control apparatus, information indicating a start time of the time proportional output to each of the plurality of switching apparatuses, and
operation as the instruction output unit comprises starting the time proportional output to each of the plurality of switching apparatuses at a time that is based on the information indicating the start time.

7. An output control system comprising:
the output control unit according to claim 2; and
the control apparatus.

8. The output control unit according to claim 1,
wherein the processor is configured with the program to perform operations such that operation as the instruction output unit comprises, in response to the operation amount changing to information indicating stop of the output apparatus, instructing the switching apparatus to stop the output apparatus at a time when the operation amount changes regardless of a cycle of the time proportional output.

9. The output control unit according to claim 1,
wherein the processor is configured with the program to perform operations such that operation as the acquisition unit comprises periodically acquiring the operation amount and the immediate output instruction from the control apparatus.

10. The output control unit according to claim 1,
wherein the processor configured with the program performing operations as the acquisition unit is connected to the control apparatus via a field network.

11. The output control unit according to claim 1,
wherein the processor is configured with the program to perform operations such that:
operation as the instruction output unit comprises subjecting a plurality of switching apparatuses to the time proportional output,
operation as the acquisition unit comprises, in response to the immediate output instruction indicating that the time proportional output is not to be autonomously controlled, acquiring, from the control apparatus, information indicating a start time of the time proportional output to each of the plurality of switching apparatuses, and operation as the instruction output unit comprises starting the time proportional output to each of the plurality of switching apparatuses at a time that is based on the information indicating the start time.

12. An output control system comprising:
the output control unit according to claim 1; and
the control apparatus.

13. A control method of an output control unit connected to a switching apparatus that switches between driving and stopping of an output apparatus, the method comprising:
acquiring, from a control apparatus, an operation amount comprising a ratio of time during which the output apparatus is driven to time during which the output apparatus is stopped, and an immediate output instruction indicating whether to autonomously control a time proportional output of an instruction to drive or stop the output apparatus to the switching apparatus or to not autonomously control the time proportional output of the instruction;
outputting the time proportional output of the instruction to drive or stop the output apparatus to the switching apparatus in accordance with the operation amount and the immediate output instruction;
updating, at the beginning of a next control cycle, in response to the immediate output instruction indicating that the output control unit autonomously controls the time proportional output and the operation amount changing, start and end times of the time proportional output based on the operation amount; and
updating, in response to the immediate output instruction indicating that the output control unit does not autonomously control the time proportional output and the operation amount changing, the start and end times of the of the time proportional output of the instruction immediately in accordance with the operation amount.

14. A non-transitory computer: readable storage medium storing a program for causing a processor of an output control unit connected to a switching apparatus that switches between driving and stopping of an output apparatus, to perform operations comprising:
acquiring, from a control apparatus, an operation amount comprising a ratio of time during which the output apparatus is driven to time during which the output apparatus is stopped, and an immediate output instruction indicating whether to autonomously control a time proportional output of an instruction to drive or stop the output apparatus to the switching apparatus or to not autonomously control the time proportional output of the instruction;
outputting the time proportional output of the instruction to drive or stop the output apparatus to the switching apparatus in accordance with the operation amount and the immediate output instruction;
updating, at the beginning of a next control cycle, in response to the immediate output instruction indicating that the output control unit autonomously controls the time proportional output and the operation amount changing start and end times of the time proportional output based on the operation amount; and
updating, in response to the immediate output instruction indicating that the output control unit does not autonomously control the time proportional output and the operation amount changing, the start and end times of the of the time proportional output of the instruction immediately in accordance with the operation amount.

* * * * *